(12) United States Patent
Liu

(10) Patent No.: US 10,061,008 B2
(45) Date of Patent: Aug. 28, 2018

(54) COMBINED ORBIT AND ATTITUDE DETERMINATION SYSTEM AND METHODS

(71) Applicant: The Boeing Company, Chicago, IL (US)

(72) Inventor: John Y. Liu, San Marino, CA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 14/733,410

(22) Filed: Jun. 8, 2015

(65) Prior Publication Data
US 2016/0047878 A1  Feb. 18, 2016

Related U.S. Application Data

(63) Continuation of application No. 13/280,344, filed on Oct. 25, 2011, now Pat. No. 9,091,552.

(51) Int. Cl.
| | | |
|---|---|---|
| *G01S 3/786* | (2006.01) | |
| *G01C 21/24* | (2006.01) | |
| *G01S 3/784* | (2006.01) | |
| *G01S 5/16* | (2006.01) | |

(52) U.S. Cl.
CPC ............ *G01S 3/7867* (2013.01); *G01C 21/24* (2013.01); *G01S 3/784* (2013.01); *G01S 3/786* (2013.01); *G01S 5/16* (2013.01)

(58) Field of Classification Search
CPC ...... B64G 1/361; B64G 1/365; G01C 21/025; G01S 3/7867; G05D 1/0883
See application file for complete search history.

(56) References Cited

U.S. PATENT DOCUMENTS

| | | | |
|---|---|---|---|
| 4,688,091 A | | 8/1987 | Kamel et al. |
| 5,108,050 A | * | 4/1992 | Maute ..................... B64G 1/24 244/164 |
| 5,749,545 A | | 5/1998 | Gnatjuk |
| 5,984,238 A | | 11/1999 | Surauer et al. |
| 6,108,593 A | * | 8/2000 | Didinsky ............... B64G 1/283 244/165 |
| 6,665,594 B1 | * | 12/2003 | Armstrong ........... G08G 5/0069 370/315 |
| 6,917,025 B1 | | 7/2005 | Diehl |
| 9,091,552 B2 | * | 7/2015 | Liu ........................ G01C 21/24 |
| 2002/0116993 A1 | | 8/2002 | Patouraux |
| 2010/0063763 A1 | * | 3/2010 | Rozelle .............. G01C 19/5691 702/92 |
| 2011/0004405 A1 | * | 1/2011 | Hutchin ............... G01C 21/025 701/513 |

FOREIGN PATENT DOCUMENTS

EP    1130487 A2    9/2001

OTHER PUBLICATIONS

GB Search Report, GB1219114.4, dated Feb. 20, 2013.

* cited by examiner

*Primary Examiner* — Kyle R Quigley
(74) *Attorney, Agent, or Firm* — McDonnell Boehnen Hulbert & Berghoff LLP

(57) ABSTRACT

A system and methods for calculating an attitude and a position of an object in space are disclosed. Measurements in relation to an object, stars, and a signal timing are received at a combined orbit and attitude determination system to provide received measurements. An estimated separation angle error, an estimated position error, and an estimated attitude error are estimated based upon the received measurements to provide estimated errors.

18 Claims, 5 Drawing Sheets

COMBINED ORBIT AND ATTITUDE DETERMINATION SYSTEM AND METHODS

CROSS REFERENCE TO RELATED APPLICATION

The present application is a continuation of U.S. patent application Ser. No. 13/280,344, filed on Oct. 25, 2011.

FIELD

Embodiments of the present disclosure relate generally to spacecraft motion determination systems. More particularly, embodiments of the present disclosure relate to combined orbit and attitude determination systems for an object.

BACKGROUND

For most spacecraft, knowledge of a position (orbit location) and attitude of the spacecraft is essential in supporting a mission of the spacecraft. A spacecraft Guidance, Navigation and Control (GNC) system relies on a set of sensors and corresponding algorithms to perform position and attitude control. Traditionally, attitude determination and position determination subsystems are two separate parts of a spacecraft such as a satellite and reply on two separate sets of sensors and processing. Both are large contributors to a cost of satellite development and satellite operations.

SUMMARY

A system and methods for calculating an attitude and a position of an object in space are disclosed. Measurements in relation to an object, stars, and a signal timing are received at a combined orbit and attitude determination system to provide received measurements. An estimated separation angle error, an estimated position error, and an estimated attitude error are estimated based upon the received measurements to provide estimated errors.

In this manner, a combined unit and/or combined processing module provides simultaneous orbit and attitude solution which can provide substantial cost savings in both development and operation of a spacecraft.

In an embodiment, a combined orbit and attitude determination system comprises a star sensor, an object sensor, and a computation module. The star sensor measures an attitude of a spacecraft in an object centered inertial coordinate frame to provide a star sensor measured attitude. The object sensor measures an object position relative to at least one star to provide an object sensor measured position. The computation module estimates an estimated separation angle error, an estimated position error, and an estimated attitude error, based upon the star sensor measured attitude, and the object sensor measured position to provide estimated errors.

In another embodiment, a method for calculating an attitude and position of an object in space receives measurements in relation to an object, stars, gyroscope rate and a signal timing at a combined orbit and attitude determination system to provide received measurements. The method then estimates an estimated separation angle error, an estimated position error, and an estimated attitude error based upon the received measurements to provide estimated errors.

In a further embodiment, a method for calculating an attitude and position of an object in space measures a star-spacecraft vector to a star relative to a spacecraft. The method then measures a plurality of glow arc points on a glow arc of a spatial body and calculates a spatial body center of the spatial body based on the glow arc points. The method further estimates an estimated separation angle error, an estimated position error, and an estimated attitude error, based upon the star-spacecraft vector, the glow arc points and the spatial body center, to provide estimated errors. The method then calculates a separation angle estimate of the star to the spatial body center based upon the star-spacecraft vector, the spatial body center and the estimated separation angle error, and calculates an updated attitude and an updated position of the spacecraft relative to the spatial body based on the separation angle estimate, a location of the star, a location of the spatial body, and the estimated errors.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
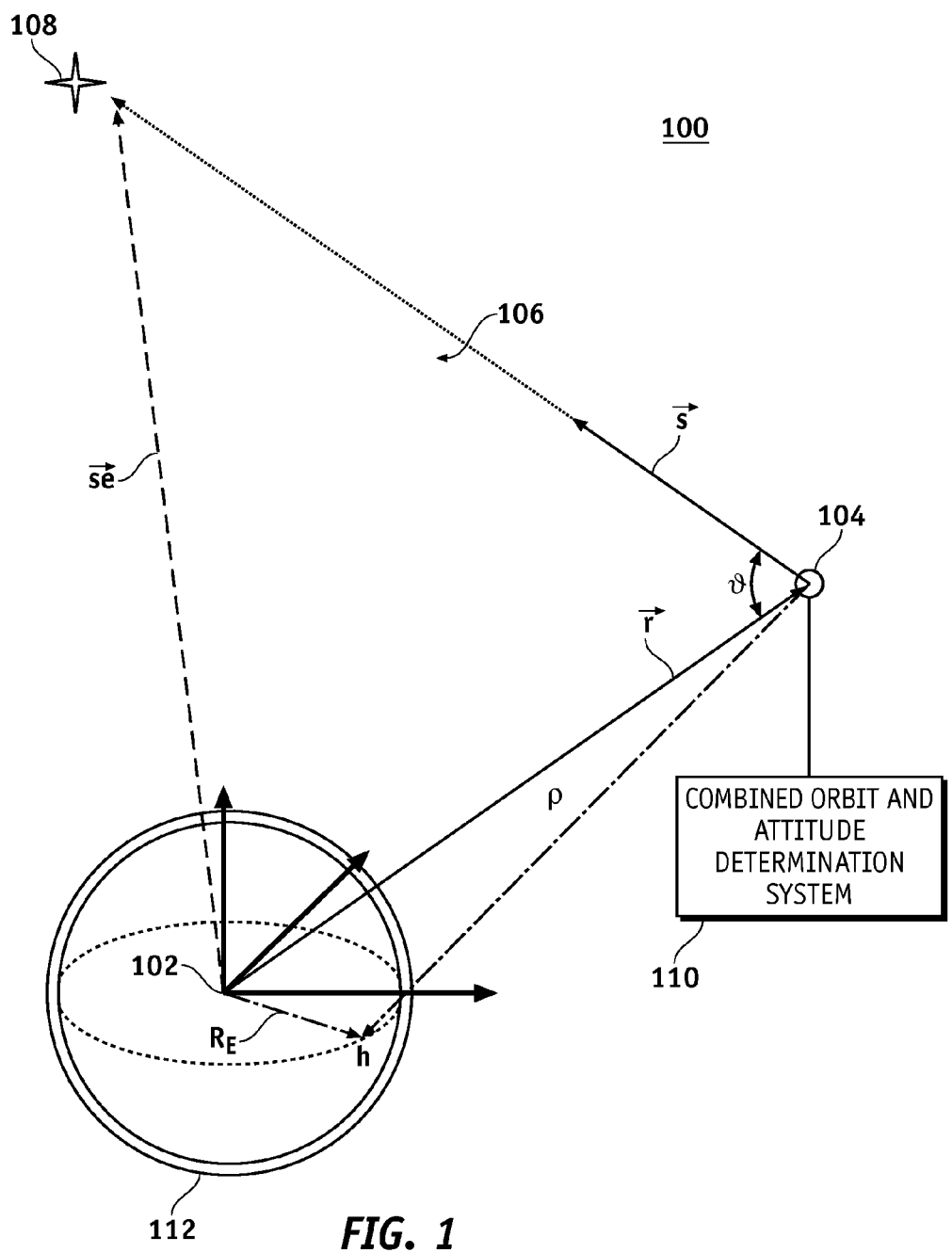
FIG. 1 is an illustration of a geometric operation environment of a combined orbit and attitude determination system according to an embodiment of disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to optical sensors, accelerometers, gyroscopes, star identification techniques, matrix operations, mathematical modeling, and other functional aspects of the systems (and the individual operating components of the systems) may not be described in detail herein.

Embodiments of the disclosure are described herein in the context of a practical non-limiting application, namely, a combined orbit and attitude determination system for a spacecraft such as a satellite relative to the Earth. Embodiments of the disclosure, however, are not limited to such Earth applications, and the techniques described herein may also be utilized in other applications. For example, embodiments may be applicable to determining an attitude and position of a spacecraft relative to a known object. The object may comprise, for example but without limitation, a moon orbiting a planet such as Earth's moon, an asteroid approaching a planet or a space station, or any other known object whose separation angle from the spacecraft is measurable.

As would be apparent to one of ordinary skill in the art after reading this description, the following are examples and embodiments of the disclosure are not limited to operating in accordance with these examples. Other embodiments may be utilized and changes may be made without departing from the scope of the exemplary embodiments of the present disclosure.

Most orbit and attitude solutions are provided separately and via very different means. Attitude can be provided by Earth sensor, sun sensor or star trackers and the orbit information by ranging technique, Global Positing System (GPS) sensor or other means. There are several shortcomings of this approach: 1) requires separate subsystems on a spacecraft for orbit and attitude determinations. Orbit determination tends to be labor intensive and involve ground intervention (ranging) or potentially un-reliable or un-available GPS, 2) requires separate hardware and processing which may be expensive to develop and use.

In contract, embodiments of the disclosure provide a plug-and-play (PnP) sensor system configured to simultaneously provide both attitude and position (six degrees of freedom (6-DOF) position) knowledge for a spacecraft such as a satellite relative to a known object such as the Earth. The PnP system comprises a combined optical sensor for simultaneously measuring both attitude and position of the spacecraft. This combined optical sensor may be coupled with small accelerometers and gyroscopes to provide more accurate measurements and/or higher bandwidth.

Embodiments of disclosure provide a system and methods to estimate a spacecraft position error in Earth centered inertial coordinate (ECI) frame $\delta^i r$, (position error $\delta^i r$), a body attitude error in ECI frame (attitude error $\delta\varphi$), or other measurement related error. Attitudes and positions of the spacecraft at a present time can be provided from a priori knowledge of previous attitudes and previous positions corrected using previously estimated respective errors. New attitudes and positions at a new present time can then be provided by updating the previous attitudes and positions by respective new estimated errors.

In this manner, embodiments of the disclosure estimate simultaneously the position error $\delta^i r$ and the attitude error $\delta\varphi$ of the spacecraft. The PnP system does not depend on a shared detector design (i.e., which may have various implementation restriction and difficulties), and in some embodiments may comprise an object sensor (Earth horizon sensor) and a star sensor independent of each other. This independence is made possible by specifically estimating the star sensor and the Earth horizon sensor separation angle error $\delta\theta$ (separation angle error $\delta\theta$) and use the estimate of the separation angle error $\delta\theta$ in the estimation process of the attitude error $\delta\varphi$ and the position error $\delta^i r$.

The PnP system described herein provides a combined sensor for orbit and attitude determination for spacecraft that doesn't depend on specific star and Earth rim sensor design. The PnP system is independent of the GPS and can use two sensors such as the object sensor and the star sensor with individual detectors independent of one another to avoid sorting out star and Earth signals on the same detector. The PnP system comprises an algorithm that directly uses measurement information to produce both orbit and attitude information in a single sensor module. Further, the PnP system comprises an Earth center determination algorithm to estimate the errors and thereby update the attitude $\varphi$ and the position r via the estimated errors comprising: separation angle error $\delta\theta$, the attitude error $\delta\varphi$, and the position error $\delta^i r$. The PnP system can use any star sensor and Earth horizon sensor combination (with scaled performance).

FIG. 1 is an illustration of a geometric operation environment 100 of a combined orbit and attitude determination system 110 (system 110) according to an embodiment of disclosure. Spacecraft position (both distance and direction of an orbit) in the ECI is determined by a position vector $\vec{r}$ (attitude-position vector $\vec{r}$) from the Earth center 102 to the spacecraft 104. With the Earth arc to the Earth center 102 angle estimated and the Earth radius $R_E$ knowledge, the distance (magnitude) of the position vector $\vec{r}$ is calculated.

To determine a direction of the position vector $\underline{r}$ a hypothetical triangle 106 can be formed by the star 108, the Earth center 102, and the spacecraft 104. A star line of sight (LOS) unit vector $\vec{s}$ (star-spacecraft vector $\vec{s}$) from the spacecraft 104 to the star 108 is known in the ECI via spacecraft 104 attitude $\varphi$ measured by the star sensor, a star-Earth vector $\vec{se}$ from the Earth center 102 to the star 108 is also known in the ECI via star catalog knowledge. With a separation angle $\theta$ between the star-spacecraft vector $\vec{s}$ and the position vector $\vec{r}$ or between the star 108 and the Earth center 102 known, and with the knowledge of the magnitude of the position vector $\vec{r}$, the direction of the position vector $\vec{r}$ is determined.

The system 110 then estimates the position error $\delta^i r$, and the attitude error $\delta\varphi$ of the spacecraft 104 simultaneously. An updated position r(k+1) (position r is a magnitude of the position vector $\vec{r}$), and an updated attitude $\varphi$(k+1) are then estimated by updating the previous magnitude r of the position vector $\vec{r}$, and the previous attitude $\varphi$ by the position error $\delta^i r$, and the attitude error $\delta\varphi$ respectively as explained in more detail in the context of discussion of FIG. 2 below.

Figure 2:
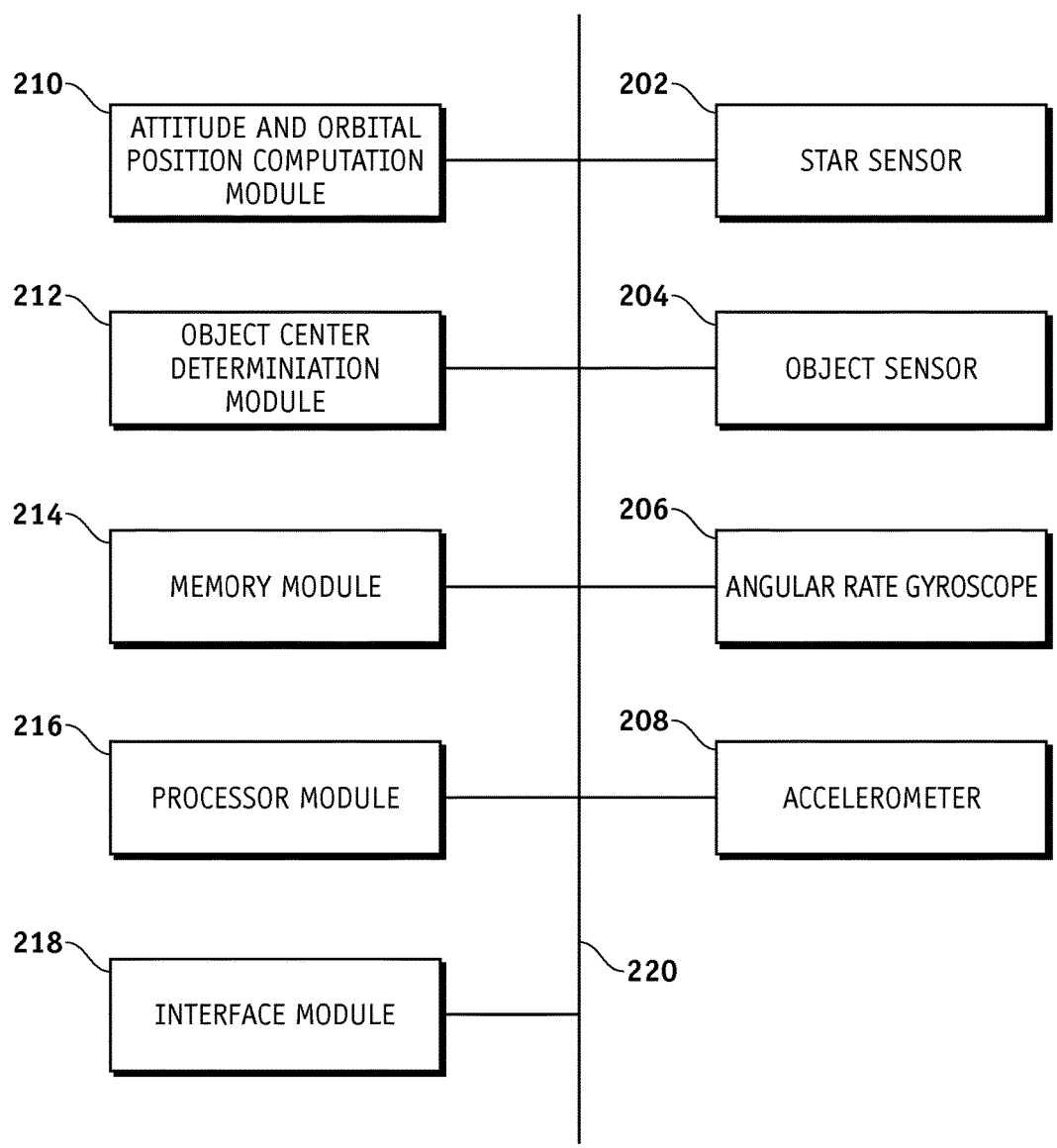
FIG. 2 is an illustration of a schematic functional block diagram of a combined orbit and attitude determination system according to an embodiment of the disclosure.
Figure 3:
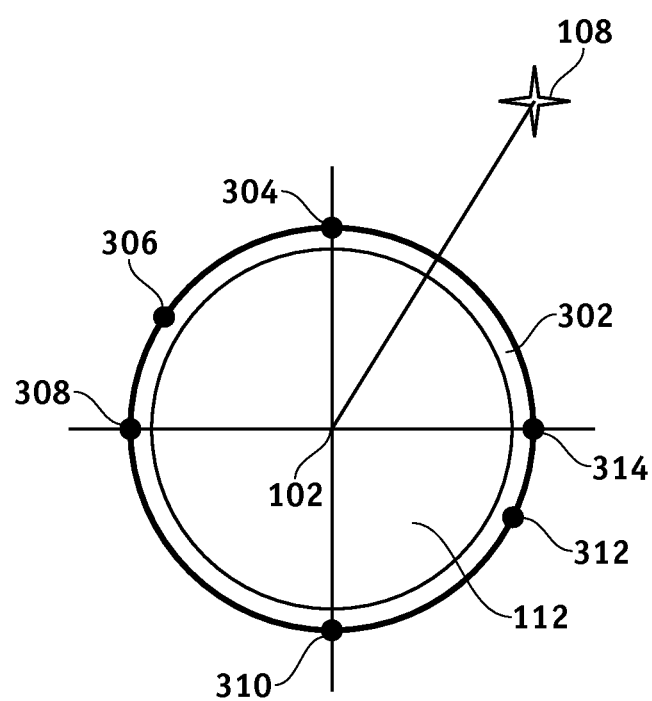
FIG. 3 is an illustration of a star/Earth separation graph showing parameters for estimating center of the Earth according to an embodiment of disclosure.

FIG. 2 is an illustration of a schematic functional block diagram of a combined orbit and attitude determination plug-and-play system 200 (PnP system 200, 110 in FIG. 1) according to an embodiment of the disclosure. FIG. 3 is an illustration of a star/Earth separation graph showing a geometry for estimating the Earth center 102 according to an embodiment of disclosure. The PnP system 200 is described herein in conjunction with FIG. 3.

As mentioned above, the PnP system 200 provides a combined sensor for orbit and attitude determination for spacecraft that doesn't depend on specific star and Earth rim sensor design. The PnP system 200 is a self-contained module that can be plugged into a spacecraft interface, significantly simplifying orbit and attitude determination for spacecraft, allowing: reduced system weight, operational cost of a spacecraft, and cost of future changes.

The various illustrative blocks, modules, processing logic, and circuits described in connection with system 200 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The PnP system 200 generally comprises a physical housing (not shown), a star sensor 202, an object sensor 204, an attitude and orbit position computation module 210, an object center determination module 212, a memory module 214, a processor module 216, and an interface module 218. In another embodiment, the PnP system 200 may also comprise an angular rate gyroscope 206, and an accelerometer 208.

A practical system 200 may comprise any number of sensor modules, any number of processor modules, any number of memory modules, and any number of computational modules. The illustrated system 200 depicts a simple embodiment for ease of description. These and other elements of the system 200 are interconnected together, allowing communication between the various elements of system 200. In one embodiment, these and other elements of the system 200 may be interconnected together via a communication link 220.

Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The star sensor 202 is configured to measure the attitude $\varphi$ of the spacecraft 104 in an Earth centered inertial coordinate frame to provide a star sensor measured attitude. The star sensor 202 may comprise, for example but without limitation, a star tracker, a sun sensor, or other sensor.

The object sensor 204 is configured to measure the magnitude of the position vector $\vec{r}$ (measured position $\vec{r}$) of an object such as the Earth 112 relative to the star 108 or cluster of stars to provide an object sensor measured position. The object sensor 204 may comprise, for example but without limitation, an Earth horizon sensor, or other sensor.

The angular rate gyroscope 206 is configured to provide additional attitude measurements such that a combination of the star sensor measured attitude and the additional attitude measurements provides an improved accuracy in determination of the attitude $\varphi$ of the spacecraft 104. An angular rate gyroscope provides a rate of change of the attitude (angular velocity) indicating how fast the attitude is changing in a continuous manner. In contrast, a star sensor may not provide the attitude measurement in a continuous manner. Therefore, combing the additional data from the angular rate gyroscope augments an accuracy of the attitude-position vector $\vec{r}$ using a gyroscopic drift of the angular rate gyroscope 206 of the spacecraft 104.

The accelerometer 208 is configured to measure external forces on the spacecraft 104.

The attitude and orbital position computation module 210 is operable to estimate the separation angle error $\delta\theta$, the position error $\delta^i r$, and the attitude error $\delta\varphi$, based upon the star sensor measured attitude $\varphi$, and the object sensor measured position r to provide estimated errors. In this document, attitude $\varphi$, and measured attitude $\varphi$ may be used interchangeably, similarly position r and measured position r may be used interchangeably.

In practice, the PnP system 110 may receive measurements in relation to the Earth 112, the star(s) 108, gyroscope rate and a signal timing (t). The PnP system 110 estimates the separation angle error $\delta\theta$, the position error $\delta^i r$, and the attitude error $\delta\varphi$, based upon the received measurements, a glow arc 302 (FIG. 3) of the Earth 112, and the Earth center 102.

The attitude error $\delta\varphi$ and the position error $\delta^i r$ are estimated based on the following relationship:

$$\underbrace{\begin{bmatrix} H_{st} & 0_{2\times 3} \\ \sqrt{{}^i r^T {}^i r}\, c^T C_{bi}^i \tilde{s} & {}^b s^T C_{bi} + \cos\theta \frac{{}^i r^T}{\sqrt{{}^i r^T {}^i r}} \\ 0_{1\times 3} & \frac{{}^i r^T \sin\rho}{\sqrt{{}^i r^T {}^i r}} \end{bmatrix}}_{H \in R^{4\times 6}} \underbrace{\begin{bmatrix} \delta\phi \\ \delta^i r \end{bmatrix}}_{x \in R^6} = \underbrace{\begin{bmatrix} y_{st} \\ y_S \\ y_R \end{bmatrix}}_{z \in R^4} - \underbrace{\begin{bmatrix} \eta_{st} \\ \eta_S \\ \eta_R \end{bmatrix}}_{\eta \in R^4} \quad (1)$$

where H is a matrix comprising known parameters, x comprises unknown parameters comprising the attitude error $\delta\varphi$ and the position error $\delta^i r$, z comprises measurements such as a star measurement $y_{st}$, a separation angle measurement $y_S$, and a range measurement $y_R$, $\eta$ comprises noise sources such as star measurement noise $\eta_{st}$, separation angle measurement noise $\eta_S$, and range measurement noise $\eta_R$, $\rho$ is an Earth horizon (glow) angle from Earth center 102, r is the measured position of the spacecraft 104 measured by the object sensor 204, b, i superscripts are used to indicate body and the ECI frames respectively, $C_{bi}$ is the ECI to the body frame transformation matrix, T indicates a matrix transpose, C is Earth center vector, $y_{st}$ comprises the measured attitude $\varphi$, $y_S$ comprises separation angle $\theta$, $y_R$ comprises the measured position r, and $H_{st}=[\hat{C}_{bi}{}^i \tilde{s}]_{1:2}$ is the first two rows of matrix $\hat{C}_{bi}{}^i \tilde{s}$.

A truth separation angle $\theta$ is calculated based on the separation angle error $\delta\theta$ to provide a separation angle estimate. The position error $\delta^i r$ is estimated based on the object sensor 204 measured position r and the truth separation angle $\theta$ (separation angle estimate $\theta$).

Alternatively, if the angular rate gyroscope 206 is used, in addition to the position error $\delta^i r$, the attitude error $\delta\varphi$, and the linear velocity error $\delta v$, a gyroscope bias "b" (b) and a gyroscope misalignment "a" (a) of the angular rate gyroscope 206 are also estimated based on the following relationship:

$$z = \begin{bmatrix} y_{st} \\ y_S \\ y_R \end{bmatrix} \quad (2)$$

$$= \underbrace{\begin{bmatrix} 0_{2\times3} & 0_{2\times3} & H_{st} & 0_{2\times3} & 0_{2\times9} \\ {}^b_S T C_{bi} + \dfrac{{}^i r^T \cos\theta}{\sqrt{{}^i r^T {}^i r}} & 0_{1\times3} & \sqrt{{}^i r^T {}^i r} \, c^T C_{bi}^i \tilde{s} & 0_{1\times3} & 0_{1\times9} \\ \dfrac{{}^i r^T \sin\rho}{\sqrt{{}^i r^T {}^i r}} & 0_{1\times3} & 0_{1\times3} & 0_{1\times3} & 0_{1\times9} \end{bmatrix}}_{H \in R^{4\times21}} \begin{bmatrix} \delta^i r \\ \delta^i v \\ \delta\phi \\ b \\ a \end{bmatrix} + \begin{bmatrix} \eta_{st} \\ \eta_S \\ \eta_R \end{bmatrix}$$

A batch and recursive filter can be built based on the measurements and the measurement equations (1) and (2) to estimate the position error $\delta^i r$, the linear velocity error $\delta v$, the attitude error $\delta\phi$, an estimated gyroscope bias "b" and an estimated gyroscope misalignment "a", and errors associated with the accelerometers 208 (not shown in equation (2)). The estimated gyroscope bias "b" may be modeled as a random walk signal. The estimated gyroscope misalignment "a" comprises a vector representing misalignments and scale factors.

The attitude and orbital position computation module 210 is also configured to update the attitude $\varphi$ of the spacecraft 104 based on the star sensor 202 measured attitude $\varphi$ and the estimated attitude error $\delta\varphi$ to provide the updated attitude $\varphi(k+1)$, and to update the position r of the spacecraft 104 based on the object sensor 204 measured position and the estimated position error $\delta^i r$ to provide an updated position r(k+1).

The updated position r(k−1), and the updated attitude $\varphi(k+1)$ are calculated at a new present time k+1 by updating a previously corrected position vector $\vec{r}(k)$, and a previously corrected attitude $\varphi(k)$ at a time k by the position error $\delta^i r$ and the attitude error $\delta\varphi$ respectively. The updated position r(k+1), and the updated attitude $\varphi(k+1)$ of the spacecraft 104 can be estimated by any magnitude and attitude estimation algorithms known in the art.

The object center determination module 212 is configured to determine a center of the object such as the Earth center 102 of the Earth 112 based on the following relationship:

$$S\theta = -\dfrac{h_S^T}{\sin\theta}\delta c - \dfrac{c^T C_{bi}^i \tilde{s}}{\sin\theta}\delta\phi \quad (3)$$

where $\delta c$ is an Earth center vector error that can be provided in terms of estimate of the separation angle error $\delta\theta$ and the attitude error $\delta\varphi$. FIG. 3 is an illustration of a star/Earth separation graph showing a geometry for estimating center of the Earth 112 or a spatial body 112. A number of glow arc points 304/306/308/310/312/314 are measured on the glow arc 302 of the Earth 112 (spatial body 112) by the object sensor 204 (e.g., an Earth horizon sensor).

An Earth center vector c of the Earth 112 is estimated based on a "circle" such as the glow arc 302 formed by the glow arc points 304/306/308/310/312/314. With more glow arc points more accurate measurement of the Earth center 102 may be provided. The Earth center 102 (spatial body center 102) of the Earth 112 is calculated based on the glow arc points 304/306/308/310/312/314.

The separation angle $\theta$ of the star 108 to the Earth center 102 is estimated based on the star-spacecraft vector $\vec{s}$, the spatial body center 102 and the estimated separation angle error $\delta\theta$. The star-spacecraft vectors $\vec{s}$ and the glow arc points 304/306/308/310/312/314 can be measured using a single measuring device according to an embodiment of the discloser.

The memory module 214, may be realized as a non-volatile storage device (non-volatile semiconductor memory, hard disk device, optical disk device, and the like), a random access storage device (for example, SRAM, DRAM), or any other form of storage medium known in the art. The memory module 214 may be coupled to the processor module 216 such that the processor module 216 can read information from, and write information to, memory module 214.

As an example, the processor module 216 and the memory module 214, may reside in their respective ASICs. The memory module 214 may also be integrated into the processor module 216. In an embodiment, the memory module 214 may include a cache memory for storing temporary variables or other intermediate information during execution of instructions to be executed by processor module 216. The memory module 214 may also include non-volatile memory for storing instructions to be executed by the processor module 216.

The memory module 214 may include a database (not shown) for storing the measured and the known data in accordance with an embodiment of the disclosure. The database may be configured to store, maintain, and provide data as needed to support the functionality of system 200 in the manner described below. Moreover, the database may be a local database coupled to the processor module 216, or may be a remote database, for example, a central network database, and the like. The database may include a lookup table for purpose of storing the data.

The data may comprise, for example but without limitation, the attitude $\varphi$, the updated attitude $\varphi(k+1)$, the position r, the updated position r(k−1), the star-spacecraft vector $\vec{s}$, the separation angle $\theta$, the separation angle error $\delta\theta$, the position error $\delta^i r$, the linear velocity error $\delta v$, the attitude error $\delta\varphi$, the estimated gyroscope bias "a", the estimated gyroscope misalignment "b", or other data. The memory module 214 may also store, a computer program that is executed by the processor module 216, an operating system, an application program, tentative data used in executing a program processing, or other application.

Processor module 216 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor module 216 comprises processing logic that is configured to carry out the functions, techniques, and processing tasks associated with the operation of the systems 200.

In particular, the processing logic is configured to support the combined orbit and attitude determination for spacecraft described herein. For, example the processor module 216 may be suitably configured to provide the data from the memory module 214 to the attitude and orbit position computation module 210 for the propose of, for example but without limitation, estimating errors such as the separation angle error δθ, the position error δ$^i$r, the linear velocity error δv, the attitude error δφ, the estimated gyroscope bias "a", the estimated gyroscope misalignment "b", or other error, and update the attitude φ, and the position r based on the estimated errors. Furthermore, the steps of a method or algorithm described in connection with the embodiments disclosed herein may be embodied directly in hardware, in firmware, in a software module executed by processor module 216, or in any practical combination thereof.

The interface module 218 is configured to allow the PnP system 200 to plug into a spacecraft interface module (not shown). The interface module may comprise circuits and/or logic operable to interface the PnP system 200 to plug into a spacecraft interface module.

Figure 4:
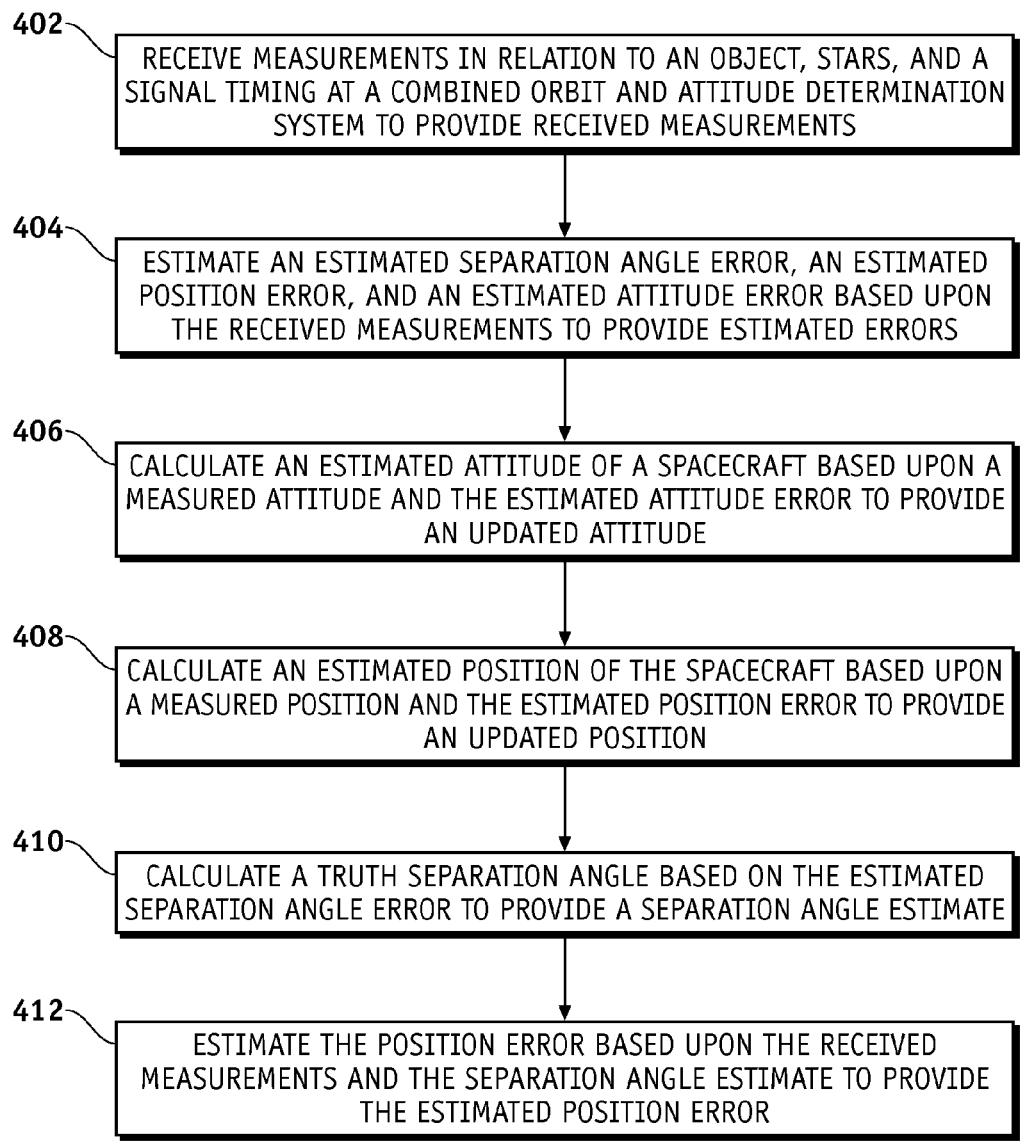
FIG. 4 is an illustration of an exemplary flowchart showing a combined orbit and attitude determination process according to an embodiment of the disclosure.

FIG. 4 is an illustration of an exemplary flowchart showing a combined orbit and attitude determination process according to an embodiment of the disclosure according to an embodiment of the disclosure.

The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the processor module 216 in which the computer-readable medium is stored.

It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein. In practical embodiments, portions of the process 400 may be performed by different elements of the system 200 such as: the object sensor 204, the attitude and orbit position computation module 210, the object center determination module 212, the memory module 214, the processor module 216, the interface module 218, the angular rate gyroscope 206, and the accelerometer 208. Process 400 may have functions, material, and structures that are similar to the embodiments shown in FIG. 4. Therefore common features, functions, and elements may not be redundantly described here.

Process 400 may begin by receiving measurements z in relation to an object, stars, gyroscope rate and a signal timing to provide received measurements (task 402).

Process 400 may then continue by estimating an estimated separation angle error δθ, an estimated position error δ$^i$r, and an estimated attitude error δφ based on the received measurements to provide estimated errors (task 404).

Process 400 may then continue by calculating an estimated attitude φ of a spacecraft such as the spacecraft 104 based on a measured attitude and the estimated attitude error δφ to provide the updated attitude φ(k+1) (task 406).

Process 400 may then continue by calculating an estimated position of the spacecraft 104 based on a measured position and the estimated position error δ$^i$r to provide an updated position r(k−1) (task 408).

Process 400 may then continue by calculating the truth separation angle θ based on the estimated separation angle error δθ to provide a separation angle estimate (task 410).

Process 400 may then continue by estimating the position error δ$^i$r based upon the received measurements and the separation angle estimate θ to provide the estimated position error δ$^i$r (task 412).

Figure 5:
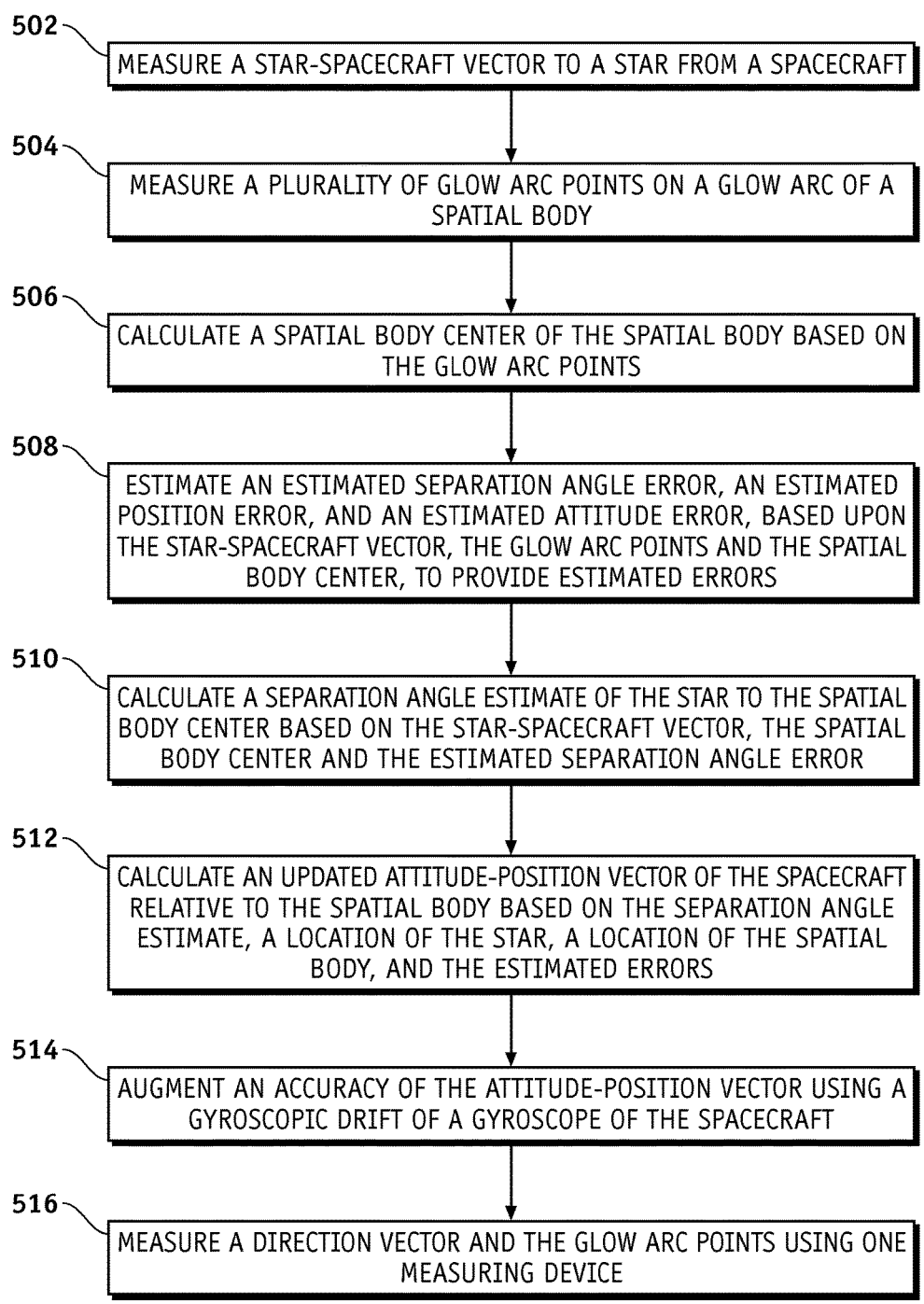
FIG. 5 is an illustration of an exemplary flowchart showing a process for calculating an attitude and position of an object in space according to an embodiment of the disclosure.

FIG. 5 is an illustration of an exemplary flowchart showing a process 500 for calculating an attitude and position of an object in space according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU such as the processor modules 218/208 in which the computer-readable medium is stored.

It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. In practical embodiments, portions of the process 500 may be performed by different elements of the systems 200 such as the object sensor 204, the angular rate gyroscope 206, the accelerometer 208, the attitude and orbit position computation module 210, the object center determination module 212, the memory module 214, the processor module 216, and the interface module 218. Process 500 may have functions, material, and structures that are similar to the embodiments shown in FIGS. 1-3. Therefore common features, functions, and elements may not be redundantly described here.

Process 500 may begin by measuring a star-spacecraft vectors to a star such as the start 108 from a spacecraft such as the spacecraft 104 (task 502).

Process 500 may then continue by measuring a plurality of glow arc points such as the glow arc points 304/306/308/310/312/314 on a glow arc such as the glow arc 302 of a spatial body such as the Earth 112 (task 504). The spatial body may comprises, for example but without limitation, the Earth 112, a planet, a moon, a dwarf planet, a comet, an asteroid, a rocket, a second spacecraft, a satellite, a space station, or other object in space.

Process 500 may then continue by calculating a spatial body center such as the Earth center 102 of the spatial body based on the glow arc points 304/306/308/310/312/314 (task 506).

Process 500 may then continue by estimating an estimated separation angle error δθ, an estimated the position error δ$^i$r, and the attitude error δφ, based upon the star-spacecraft vector $\vec{s}$, the glow arc points $\vec{s}$ and the spatial body center 102, to provide the estimated errors (task 508).

Process 500 may then continue by calculating a separation angle estimate θ of the star 108 to the spatial body center 102 based on the star-spacecraft vector $\vec{s}$, the spatial body center and the estimated separation angle error δθ (task 510).

Process 500 may then continue by calculating an updated attitude-position vector of the spacecraft 104 relative to the spatial body 112 based on the separation angle estimate θ, a location of the star 108, a location of the spatial body, and the estimated errors (task 512).

Process 500 may then continue by augmenting an accuracy of the attitude-position vector $\vec{r}$ using a gyroscopic drift of a gyroscope such as the angular rate gyroscope 206 of the spacecraft 104 (task 514).

Process 500 may then continue by measuring the star-spacecraft vector $\vec{s}$ and the glow arc points 304/306/308/310/312/314 using one measuring device (task 516).

In this manner, embodiments of the disclosure provide a combined orbit and attitude determination plug-and-play system.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according to embodiments of the present disclosure.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, and the like. In this document, the term real-time refers to both real-time and near-real-time.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 216 to cause the processor module 216 to perform specified operations. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A combined spacecraft position and attitude determination system comprising:
 a spacecraft;
 a star sensor operable to measure an attitude of the spacecraft in an object centered inertial coordinate frame to provide a star sensor measured attitude;
 an object sensor operable to measure an object position of a space object relative to a direction of at least one star independently of orbital parameters of the spacecraft to provide an object sensor measured position; and
 a computation processor operable to (i) based upon the star sensor measured attitude and the object sensor measured position, estimate an estimated separation angle error between a separation angle and a separation angle estimate, wherein the separation angle is characterized by one angle between: a first line-of-sight vector from the spacecraft to the at least one star, and a second line-of-sight vector from the spacecraft to the space object, and (ii) to estimate an estimated position error of the spacecraft and an estimated attitude error of the spacecraft based on the following relationship:

$$[H]\begin{bmatrix} \delta\phi \\ \delta^i r \end{bmatrix} = \begin{bmatrix} y_{st} \\ y_s \\ y_R \end{bmatrix} - \begin{bmatrix} \eta_{st} \\ \eta_S \\ \eta_R \end{bmatrix}$$

where H is a matrix comprising known parameters, $\delta\phi$ is the estimated attitude error, $\delta^i r$ is the estimated position error, $y_{st}$ is a star measurement, $y_s$ is a separation angle measurement, $y_R$ is a range measurement, $\eta_{st}$ is a star measurement noise, $\eta_S$ is a separation angle measurement noise, $\eta_R$ is a range measurement noise, wherein the computation processor is further operable to: calculate an estimated attitude of the spacecraft based on the star sensor measured attitude and the estimated attitude error to provide an updated attitude, and calculate an estimated position of the spacecraft based on the object sensor measured position and the estimated position error to provide an updated position of the spacecraft, wherein the computation module controls position and attitude of the spacecraft based on the updated attitude and the updated position of the spacecraft.

2. The system of claim 1, wherein the computation processor is further operable to calculate the estimated position error by:

calculating the separation angle based on the estimated separation angle error to provide the separation angle estimate; and estimating the estimated position error based upon the object sensor measured position and the separation angle estimate.

3. The system of the claim 1, further comprising:

an angular rate gyroscope operable to provide additional attitude measurements such that a combination of the star sensor measured attitude and the additional attitude measurements provides an improved accuracy in determination of the attitude of the spacecraft; and an accelerometer operable to measure external forces on the spacecraft.

4. The system of the claim 1, wherein the combined position and attitude determination system is a plug-and-play system.

5. The system of the claim 1, wherein the object sensor comprises a first detector operable to detect the object sensor measured position comprising a translational position of the object, and the star sensor comprises a second detector independent of the first detector.

6. The system of the claim 1, wherein the object sensor and the star sensor comprise a single module comprising individual detectors independent of one another and operable to measure the object sensor measured position and the attitude of the spacecraft respectively.

7. The system of the claim 1, further comprising computing the estimated errors based on a following relationship:

$$\underbrace{\begin{bmatrix} H_{st} & 0_{2\times 3} \\ \sqrt{^i r^T {^i r}}\, c^T C_{bi}^i \tilde{s} & {^b s^T} C_{bi} + \cos\theta \frac{^i r^T}{\sqrt{^i r^T {^i r}}} \\ 0_{1\times 3} & \frac{^i r^T \sin\rho}{\sqrt{^i r^T {^i r}}} \end{bmatrix}}_{H \in R^{4\times 6}} \underbrace{\begin{bmatrix} \delta\phi \\ \delta^i r \end{bmatrix}}_{x \in R^6} = \underbrace{\begin{bmatrix} y_{st} \\ y_s \\ y_R \end{bmatrix}}_{z \in R^4} - \underbrace{\begin{bmatrix} \eta_{st} \\ \eta_S \\ \eta_R \end{bmatrix}}_{\eta \in R^4}$$

where H is the matrix comprising known parameters, x comprises unknown parameters comprising the estimated attitude error $\delta\phi$, and the estimated position error $\delta^i r$, z comprises measurements comprising a star measurement $y_{st}$, a separation angle measurement $y_s$, and a range measurement $y_r$, $\eta$ comprises noise sources comprising star measurement noise $\eta_{st}$, separation angle measurement noise $\eta_s$, and range measurement noise $\eta_R$, $\rho$ is an Earth horizon (glow) angle from Earth center, $\theta$ is the separation angle, s is a spacecraft-to-star unit vector, r is the object sensor measured position, b, i superscripts are used to indicate body and ECI frames respectively, $C_{bi}$ is an ECI to a body frame transformation matrix, T indicates a matrix transpose, c is the Earth center vector, $H_{st} = [\hat{C}_{bi}{^i \tilde{s}}]_{1:2}$ is a first two rows of matrix $\hat{C}_{bi}{^i \tilde{s}}$ and the matrix $\hat{C}_{bi}{^i \tilde{s}}$ is a product of a matrix ${^i \tilde{s}}$ and a matrix $\hat{C}_{bi}$, where ${^i \tilde{s}}$ is a matrix formed from spacecraft-to-star unit vector s in the ECI frame (i), and $\hat{C}_{bi}$ is an estimate of $C_{bi}$.

8. The system of the claim 1, further comprising an object center determination processor operable to determine a center of the object.

9. A method for calculating an attitude and a position of a spacecraft coupled to a processor, the method comprising:

measuring, by a star sensor, an attitude of the spacecraft to provide a star sensor measured attitude;

measuring, by an object sensor, an object position of a space object relative to a direction of at least one star independently of orbital parameters of the spacecraft to provide an object sensor measured position;

estimating, based upon the star sensor measured attitude and the object sensor measured position, by action of the processor an estimated separation angle error between a separation angle and a separation angle estimate, wherein the separation angle is characterized by one angle between: a first line-of-sight vector from the spacecraft to the at least one star, and a second line-of-sight vector from the spacecraft to the space object;

estimating an estimated position error of the spacecraft and an estimated attitude error of the spacecraft, to determine the position and the attitude of the spacecraft, based on the following relationship:

$$[H]\begin{bmatrix} \delta\phi \\ \delta^i r \end{bmatrix} = \begin{bmatrix} y_{st} \\ y_s \\ y_R \end{bmatrix} - \begin{bmatrix} \eta_{st} \\ \eta_S \\ \eta_R \end{bmatrix}$$

where H is a matrix comprising known parameters, $\delta\phi$ is the estimated attitude error, $\delta^i r$ is the estimated position error, $y_{st}$ is a star measurement, $y_s$ is a separation angle measurement, $y_R$ is a range measurement, $\eta_{st}$ is a star measurement noise, $\eta_S$ is a separation angle measurement noise, $\eta_R$ is a range measurement noise;

calculating an estimated attitude of the spacecraft based on the star sensor measured attitude and the estimated attitude error to provide an updated attitude of the spacecraft;

calculating an estimated position of the spacecraft based on the object sensor measured position and the estimated position error to provide an updated position of the spacecraft; and controlling position and attitude of the spacecraft based on the updated attitude and the updated position of the spacecraft.

10. The method of claim 9, wherein the received measurements further comprise measurements in relation to a gyroscope rate, and the estimated errors further comprise an estimated gyroscope bias and an estimated gyroscope misalignment.

11. The method of claim 9, further comprising estimating the estimated position error by:

calculating the separation angle based on the estimated separation angle error to provide the separation angle estimate; and estimating the estimated position error based upon the received measurements and the separation angle estimate.

12. The method of claim 9, further comprising determining a center of the object.

13. The method of claim 9, further comprising receiving measurements comprising an attitude of a spacecraft, a position of the spacecraft, and the separation angle.

14. The method of claim 9, further comprising estimating the estimated errors based on a following relationship:

$$\underbrace{\begin{bmatrix} H_{st} & 0_{2\times 3} \\ \sqrt{{}^i r^T {}^i r}\, c^T C_{bi}^i \tilde{s} & {}^b s^T C_{bi} + \cos\theta \frac{{}^i r^T}{\sqrt{{}^i r^T {}^i r}} \\ 0_{1\times 3} & \frac{{}^i r^T \sin\rho}{\sqrt{{}^i r^T {}^i r}} \end{bmatrix}}_{H \in R^{4\times 6}} \underbrace{\begin{bmatrix} \delta\phi \\ \delta^i r \end{bmatrix}}_{x \in R^6} = \underbrace{\begin{bmatrix} y_{st} \\ y_S \\ y_R \end{bmatrix}}_{z \in R^4} - \underbrace{\begin{bmatrix} \eta_{st} \\ \eta_S \\ \eta_R \end{bmatrix}}_{\eta \in R^4}$$

where H is the matrix comprising known parameters, x comprises unknown parameters comprising the estimated attitude error $\delta\phi$, and the estimated position error $\delta^i r$, z comprises measurements comprising a star measurement $y_{st}$, a separation angle measurement $y_s$, and a range measurement $y_r$, $\eta$ comprises noise sources comprising star measurement noise $\eta_{st}$, separation angle measurement noise $\eta_s$, and range measurement noise $\eta_R$, $\rho$ is an Earth horizon (glow) angle from Earth center, $\theta$ is the separation angle, s is a spacecraft-to-star unit vector, r is the object sensor measured position, b, i superscripts are used to indicate body and ECI frames respectively, $C_{bi}$ is an ECI to a body frame transformation matrix, T indicates a matrix transpose, c is the Earth center vector, $H_{st}=[\hat{C}_{bi}{}^i\tilde{s}]_{1:2}$ is a first two rows of matrix $\hat{C}_{bi}{}^i\tilde{s}$, and the matrix $\hat{C}_{bi}{}^i\tilde{s}$ is a product of a matrix ${}^i\tilde{s}$ and a matrix $\hat{C}_{bi}$ where ${}^i\tilde{s}$ is a matrix formed from spacecraft-to-star unit vector s in the ECI frame (i) and $\hat{C}_{bi}$ is an estimate of $C_{bi}$.

15. A method for calculating an attitude and a position of a spacecraft coupled to a processor, the method comprising:

measuring by action of the processor a star-spacecraft vector to a star from a spacecraft;

measuring by action of the processor a plurality of glow arc points on a glow arc of a spatial body;

measuring, by an object sensor, an object position of a space object to provide an object sensor measured position;

calculating by action of the processor a spatial body center of the spatial body based on the glow arc points;

estimating by action of the processor and independently of orbital parameters of the spacecraft an estimated separation angle error between a separation angle and a separation angle estimate, based upon the star-spacecraft vector, the glow arc points and the spatial body center, wherein the separation angle is characterized by one angle between the star-spacecraft vector and a position vector to the spatial body center;

estimating by action of the processor and independently of orbital parameters of the spacecraft an estimated position error of the spacecraft and an estimated attitude error of the spacecraft, based upon the star-spacecraft vector, the glow arc points and the spatial body center, to provide estimated errors to determine the position and the attitude of the spacecraft independent of the orbital parameters, wherein estimating the estimated errors is based on a following relationship:

$$\underbrace{\begin{bmatrix} H_{st} & 0_{2\times 3} \\ \sqrt{{}^i r^T {}^i r}\, c^T C_{bi}^i \tilde{s} & {}^b s^T C_{bi} + \cos\theta \frac{{}^i r^T}{\sqrt{{}^i r^T {}^i r}} \\ 0_{1\times 3} & \frac{{}^i r^T \sin\rho}{\sqrt{{}^i r^T {}^i r}} \end{bmatrix}}_{H \in R^{4\times 6}} \underbrace{\begin{bmatrix} \delta\phi \\ \delta^i r \end{bmatrix}}_{x \in R^6} = \underbrace{\begin{bmatrix} y_{st} \\ y_S \\ y_R \end{bmatrix}}_{z \in R^4} - \underbrace{\begin{bmatrix} \eta_{st} \\ \eta_S \\ \eta_R \end{bmatrix}}_{\eta \in R^4}$$

where H is a matrix comprising known parameters, x comprises unknown parameters comprising the estimated attitude error $\delta\phi$, and the estimated position error $\delta^i r$, z comprises measurements comprising a star measurement $y_{st}$, a separation angle measurement $y_s$, and a range measurement $y_r$, $\eta$ comprises noise sources comprising star measurement noise $\eta_{st}$, separation angle measurement noise $\eta_s$, and range measurement noise $\eta_R$, $\rho$ is an Earth horizon (glow) angle from Earth center, $\theta$ is the separation angle, s is a spacecraft-to-star unit vector, r is the object sensor measured position, b, i superscripts are used to indicate body and Earth centered inertial coordinate (ECI) frames respectively, $C_{bi}$ is an ECI to a body frame transformation matrix, T indicates a matrix transpose, c is the Earth center vector, $H_{st}=[\hat{C}_{bi}{}^i\tilde{s}]_{1:2}$ is a first two rows of matrix $\hat{C}_{bi}{}^i\tilde{s}$, and the matrix $\hat{C}_{bi}{}^i\tilde{s}$ is a product of a matrix ${}^i\tilde{s}$ and a matrix $\hat{C}_{bi}$, where ${}^i\tilde{s}$ is a matrix formed from spacecraft-to-star unit vectors in the ECI frame (i), and $\hat{C}_{bi}$ is an estimate of $C_{bi}$;

calculating by action of the processor the separation angle estimate of the star to the spatial body center based on the star-spacecraft vector, the spatial body center and the estimated separation angle error;

calculating by action of the processor an updated attitude of the spacecraft and an updated position of the spacecraft relative to the spatial body based on the separation angle estimate, a direction of the star, a direction of the spatial body, and the estimated error; and controlling position and attitude of the spacecraft based on the updated attitude and the updated position of the spacecraft.

16. The method of claim 15, further comprising calculating by action of the processor a direction of the spatial body comprising: Earth, a planet, a moon, a dwarf planet, a comet, an asteroid, a rocket, a second spacecraft, a satellite, or a space station.

17. The method of claim 15, further comprising augmenting an accuracy of the updated attitude and the updated position using a gyroscopic drift of a gyroscope of the spacecraft.

18. The method of claim 15, further comprising measuring the star-spacecraft vector and the glow arc points using one measuring device.

\* \* \* \* \*